United States Patent
Yoshida et al.

(10) Patent No.: US 8,361,304 B2
(45) Date of Patent: Jan. 29, 2013

(54) WATER ELECTROLYSIS SYSTEM AND METHOD OF OPERATING SAME

(75) Inventors: Nobuyoshi Yoshida, Utsunomiya (JP); Koji Nakazawa, Utsunomiya (JP); Masanori Okabe, Nerima-ku (JP); Jun Takeuchi, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 88 days.

(21) Appl. No.: 13/076,110

(22) Filed: Mar. 30, 2011

(65) Prior Publication Data

US 2011/0240486 A1    Oct. 6, 2011

(30) Foreign Application Priority Data

Mar. 30, 2010 (JP) ................. 2010-079329
Dec. 7, 2010 (JP) ................. 2010-272265

(51) Int. Cl.
*C02F 1/461* (2006.01)
(52) U.S. Cl. ........ 205/629; 205/628; 205/637; 204/252; 204/266
(58) Field of Classification Search .......... 205/628, 205/629; 204/252, 266
See application file for complete search history.

(56) References Cited

U.S. PATENT DOCUMENTS 5,980,726 A    11/1999 Moulthrop, Jr. et al.
2005/0121315 A1*  6/2005 Baltrucki et al. .......... 204/228.4

FOREIGN PATENT DOCUMENTS

JP    2003-139352    5/2003

OTHER PUBLICATIONS

Japanese Office Action for Application No. 2010-272265, 3 ages., dated Sep. 25, 2012.

* cited by examiner

*Primary Examiner* — Arun S Phasge
(74) *Attorney, Agent, or Firm* — Nelson Mullins Riley & Scarborough LLP; Anthony A. Laurentano (57) ABSTRACT

A water electrolysis system includes a water electrolysis apparatus for producing high-pressure hydrogen by electrolyzing pure water and a casing. The casing defines therein an accommodating chamber accommodating the water electrolysis apparatus etc. therein, first electric component compartments separate from the accommodating chamber and housing a controller and an electrolysis power supply therein, the first electric component compartments having first fans for introducing external air, and a second electric component compartment separate from the accommodating chamber and housing a relay, the second electric component compartment being connected to the first electric component compartments by a pipe.

5 Claims, 8 Drawing Sheets

WATER ELECTROLYSIS SYSTEM AND METHOD OF OPERATING SAME

CROSS-REFERENCE TO RELATED APPLICATION

This application is based upon and claims the benefit of priority from Japanese Patent Applications No. 2010-079329 filed on Mar. 30, 2010 and No. 2010-272265 filed on Dec. 7, 2010, of which the contents are incorporated herein by reference.

BACKGROUND OF THE INVENTION

1. Field of the Invention

The present invention relates to a water electrolysis system having a water electrolysis apparatus which includes an electrolyte membrane and current collectors disposed on respective opposite sides of the electrolyte membrane, providing anodes and cathodes, wherein the water electrolysis apparatus electrolyzes water to generate oxygen on the anodes and hydrogen on the cathodes, and a casing which has a chamber accommodating the water electrolysis apparatus therein, and a method of operating such a water electrolysis system.

2. Description of the Related Art

Solid polymer electrolyte fuel cells generate DC electric energy when anodes thereof are supplied with a fuel gas, i.e., a gas mainly composed of hydrogen, e.g., a hydrogen gas, and cathodes thereof are supplied with an oxygen-containing gas, a gas mainly composed of oxygen, e.g., air.

Generally, water electrolysis apparatus are used to generate a hydrogen gas for use as a fuel gas for such solid polymer electrolyte fuel cells. The water electrolysis apparatus employ a solid polymer electrolyte membrane (ion exchange membrane) for decomposing water to generate hydrogen (and oxygen). Electrode catalyst layers are disposed on the respective sides of the solid polymer electrolyte membrane, making up a membrane electrode assembly. Current collectors are disposed on the respective opposite sides of the membrane electrode assembly, making up a unit. The unit is essentially similar in structure to the fuel cells described above.

A plurality of such units are stacked, and a voltage is applied across the stack while water is supplied to the current collectors on the anode side. On the anodes of the membrane electrode assembly, the water is decomposed to produce hydrogen ions (protons). The hydrogen ions move through the solid polymer electrolyte membranes to the cathodes, where the hydrogen ions combine with electrons to generate hydrogen. On the anodes, oxygen generated together with hydrogen is discharged with excess water from the units.

Figure 8:
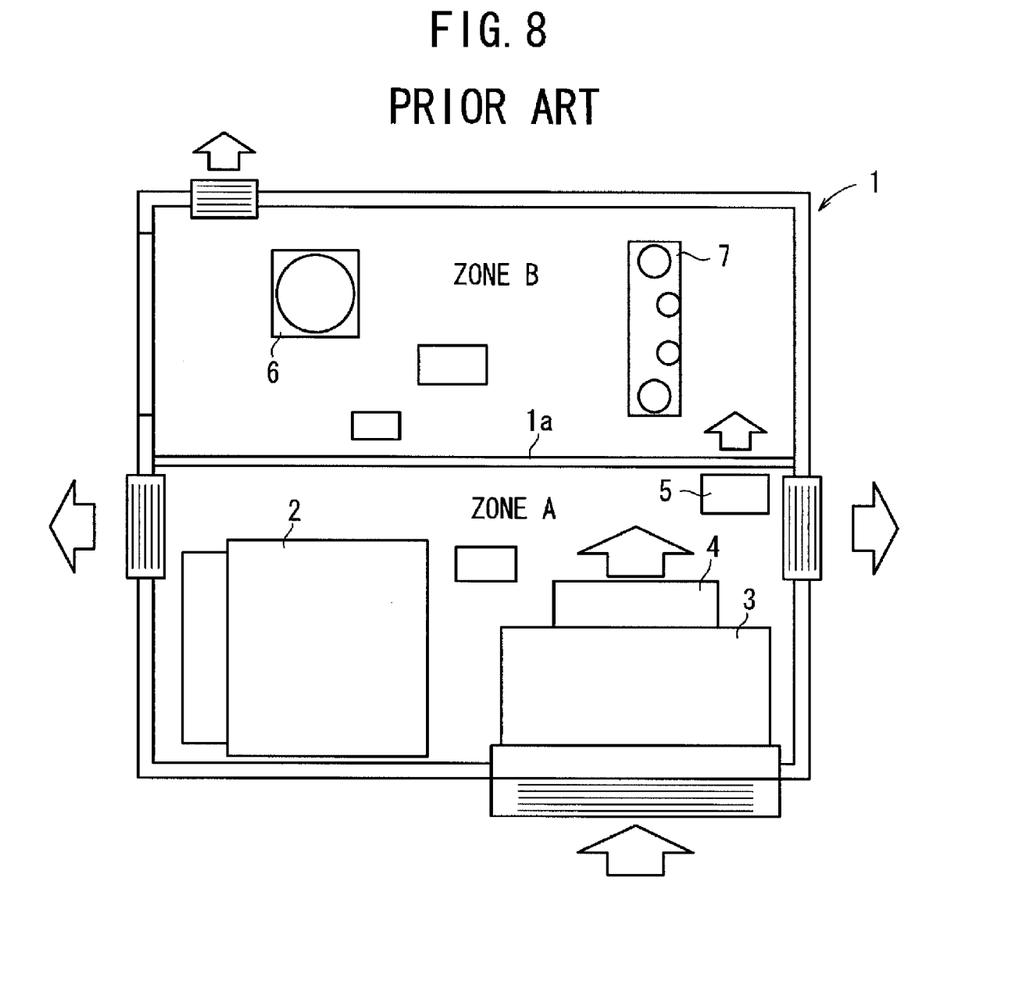
FIG. 8 is a schematic view of a hydrogen producing system disclosed in U.S. Pat. No. 5,980,726.

U.S. Pat. No. 5,980,726, for example, discloses a hydrogen producing system as a water electrolysis system incorporating such a water electrolysis apparatus. As shown in FIG. 8 of the accompanying drawings, the disclosed hydrogen producing system includes a casing 1 whose internal space is divided into a zone A and a zone B by a wall 1a. The zone A accommodates therein an electric power supply unit 2, a heat exchanger 3, a fan 4, and a blower 5, etc., whereas the zone B accommodates therein a cell stack 6 and a hydrogen drier 7, etc.

When the fan 4 is actuated, it introduces external air into the zone A to cool the heat exchanger 3 and the electric power supply unit 2 and also to keep the zone A under a positive pressure. When the blower 5 is actuated, it introduces heated clean air from the zone A into the zone B, keeping the zone B under a pressure which prevents external air from entering the zone B.

The zone A is kept under the positive pressure to prevent a hydrogen gas from flowing into the zone A. Usually, the zone A houses therein various electric components such as the electric power supply unit 2 and the like that need to be isolated from a hydrogen gas atmosphere.

The electric components housed in the zone A include electric components which are susceptible to noise and electric components which tend to generate high-level noise. Since it is not desirable to have these electric components placed altogether in the zone A for their desired performance, it is necessary to divide the zone A into a plurality of compartments which are associated with respective blowers 5 and place the electric components separately in the compartments. However, such a zone structure is complex and uneconomical.

SUMMARY OF THE INVENTION

It is an object of the present invention to provide a water electrolysis system which is simple and economical and which is capable of accommodating various electronic components in an appropriate environment.

According to the present invention, there is provided a water electrolysis system comprising a water electrolysis apparatus including an electrolyte membrane and current collectors disposed on respective opposite anode and cathode sides of the electrolyte membrane, wherein the water electrolysis apparatus electrolyzes water to generate oxygen on the anode side and hydrogen on the cathode side, and a casing having an accommodating chamber accommodating the water electrolysis apparatus therein.

The casing defines therein a first electric component compartment separate from the accommodating chamber and housing a first electric component therein, the first electric component compartment having a first fan for introducing external air, and a second electric component compartment separate from the accommodating chamber and housing a second electric component therein, the second electric component compartment being connected to the first electric component compartment by a pipe.

Preferably, the pipe doubles as an air duct and a wiring duct.

Preferably, the accommodating chamber is kept under a negative pressure, and the first electric component compartment and the second electric component compartment are kept under a positive pressure.

The first electric component compartment may be divided into two first electric component compartments. One of the first electric component compartments may house therein electronic components which produce a relatively small amount of heat and are susceptible to heat and noise, and the other first electric component compartment may house therein electronic components which produce a relatively large amount of heat and a low level of noise.

The second electric component compartment may house therein electronic components which produce a relatively small amount of heat and a high level of noise and are resistant to heat.

The first electric component compartment may have a first fan for introducing external air, and the accommodating chamber may have a second fan for discharging internal air. The second fan may be disposed above the water electrolysis apparatus, and a hydrogen sensor may be disposed in the accommodating chamber near the second fan.

According to the present invention, there is also provided a method of operating a water electrolysis system having a water electrolysis apparatus which includes an electrolyte membrane and current collectors disposed on respective opposite anode and cathode sides of the electrolyte membrane, wherein the water electrolysis apparatus electrolyzes water to generate oxygen on the anode side and hydrogen on the cathode side, and a casing having an accommodating chamber accommodating the water electrolysis apparatus therein and an electric component compartment separate from the accommodating chamber and housing an electric component therein.

The method comprises a first step of keeping the electric component compartment under a positive pressure while ventilating the electric component compartment, a second step of keeping the accommodating chamber under a negative pressure while ventilating the accommodating chamber after the first step is started, and a third step of starting to operate the water electrolysis apparatus after the second step is started.

Preferably, when the water electrolysis apparatus is shut down and the water electrolysis system enters a standby mode, the electric component compartment is continuously ventilated and the accommodating chamber stops being ventilated.

According to the present invention, external air is introduced from outside of the casing into the first electric component compartment by the fan, cooling the first electric components in the first electric component compartment and keeping the first electric component compartment, for example, under a positive pressure. Air is also introduced from the first electric component compartment into the second electric component compartment through the pipe, keeping the second electric component compartment, for example, under a positive pressure.

The first electric components and the second electric components which have different characteristics are not placed in one compartment, but housed in different compartments. Therefore, the first electric components and the second electric components do not adversely affect each other. The second electric component compartment is free of any air blowers such as a fan. The number of fans that are required to maintain a positive pressure in the water electrolysis system is thus effectively reduced, making the water electrolysis system simple and economical and making it possible to accommodate various electronic components in an appropriate environment.

The electric component compartment is initially kept under a positive pressure, and then the accommodating chamber is kept under a negative pressure while being ventilated, after which the water electrolysis apparatus is operated. Even if hydrogen leaks from the water electrolysis apparatus into the accommodating chamber, it is reliably prevented from entering into the electric component compartment. Therefore, the electric component compartment is not required to be highly hermetically sealed with respect to the accommodating chamber. The water electrolysis system is thus simple in structure and economical to manufacture.

The above and other objects, features, and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
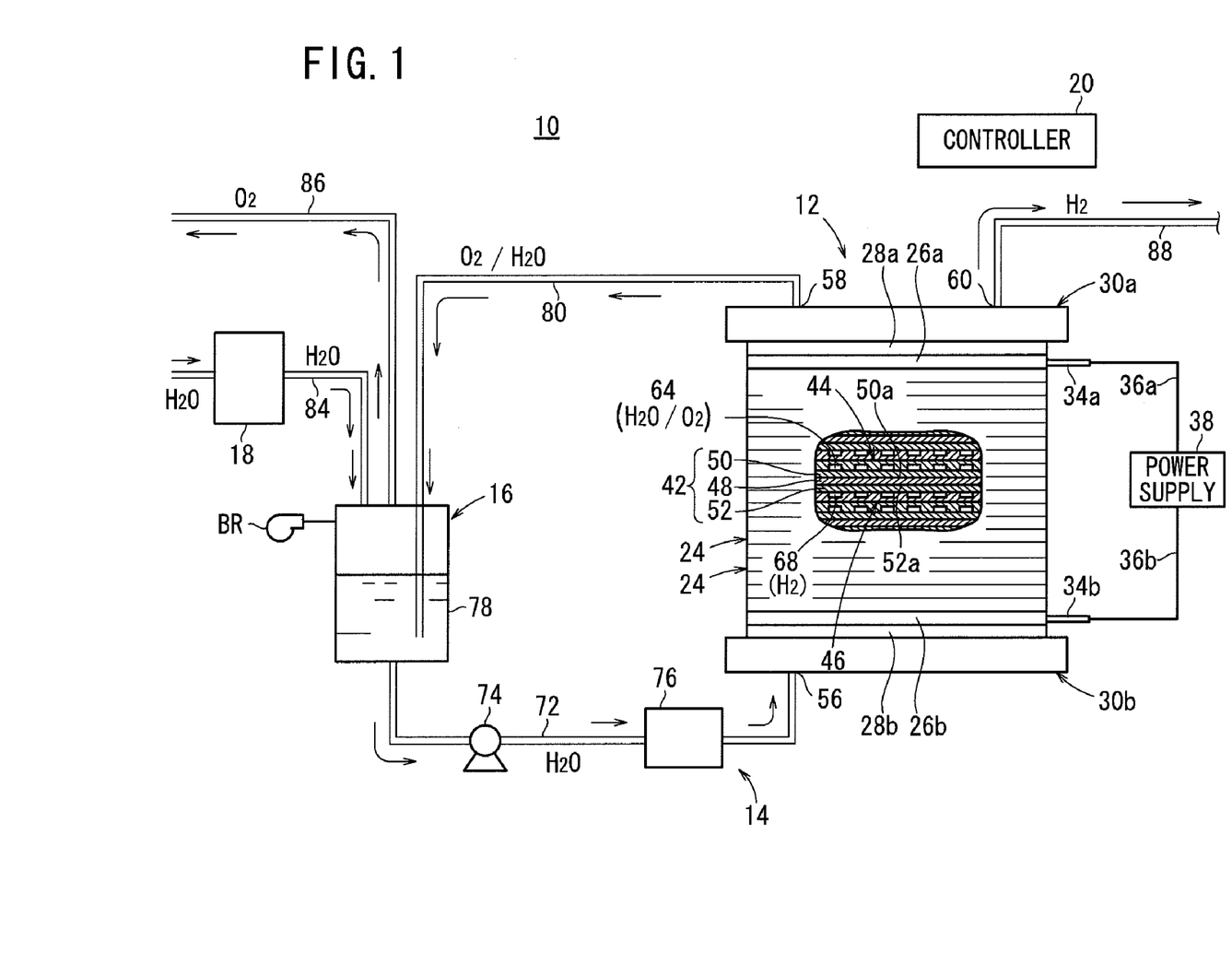
FIG. 1 is a schematic view, partly in block form, of a water electrolysis system according to a first embodiment of the present invention.
Figure 2:
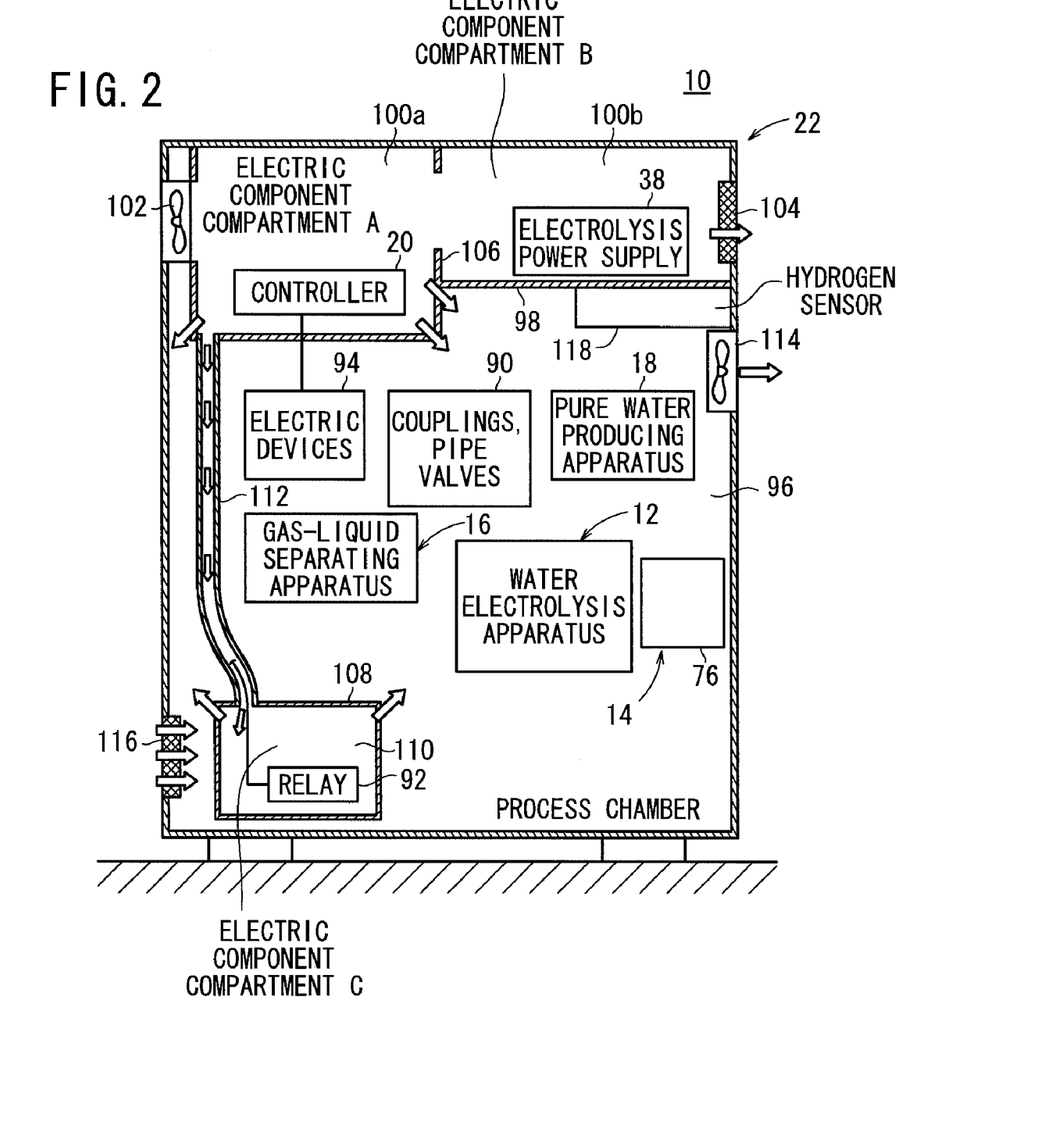
FIG. 2 is a schematic view of the water electrolysis system according to the first embodiment.

As shown in FIGS. 1 and 2, a water electrolysis system 10 according to a first embodiment of the present invention includes a water electrolysis apparatus 12 for electrolyzing water (pure water) to produce oxygen and high-pressure hydrogen (hydrogen under a pressure higher than the normal pressure), a water circulating apparatus 14 for circulating the water to the water electrolysis apparatus 12, a gas-liquid separating apparatus 16 for separating the oxygen and hydrogen (gas) discharged from the water electrolysis apparatus 12 from the water in the water circulating apparatus 14 and storing the water, and a pure water producing apparatus 18 for supplying pure water produced from tap water to the gas-liquid separating apparatus 16, and a controller 20. The water electrolysis apparatus 12, the water circulating apparatus 14, the gas-liquid separating apparatus 16, the pure water producing apparatus 18, and the controller 20 are accommodated in a casing 22.

As shown in FIG. 1, the water electrolysis apparatus 12 includes a stack assembly comprising a plurality of stacked unit cells 24. The water electrolysis apparatus 12 also includes a terminal plate 26a, an insulating plate 28a, and an end plate 30a which are mounted on an end of the stack assembly in a successive array outwardly in the order named, and a terminal plate 26b, an insulating plate 28b, and an end plate 30b which are mounted on the other end of the stack assembly in a successive array outwardly in the order named. The stack assembly, the terminal plates 26a, 26b, and the insulating plates 28a, 28b which are disposed between the end plates 30a, 30b are fastened integrally together.

Terminals 34a, 34b project outwardly from respective side edges of the terminal plates 26a, 26b. The terminals 34a, 34b are electrically connected to an electrolysis power supply 38 by electric wires 36a, 36b, respectively. The terminal 34a, which is an anode terminal, is connected to the positive terminal of the electrolysis power supply 38, and the terminal 34b, which is a cathode terminal, is connected to the negative terminal of the electrolysis power supply 38.

Each of the unit cells 24 comprises a disk-shaped membrane electrode assembly 42, and an anode separator 44 and a cathode separator 46 which sandwich the membrane electrode assembly 42 therebetween. Each of the anode separator 44 and the cathode separator 46 is of a disk shape and is in the form of a carbon plate, a steel plate, a stainless steel plate, a titanium plate, an aluminum plate, a plated steel plate, a metal plate pressed to shape after its surface is treated into a corrosion-resistant layer, or a metal plate whose surface is treated into a corrosion-resistant layer after it is cut to shape.

The membrane electrode assembly 42 has a solid polymer electrolyte membrane 48 comprising a thin membrane of perfluorosulfonic acid which is impregnated with water, and an anode current collector 50 and a cathode current collector 52 which are disposed respectively on the opposite surfaces of the solid polymer electrolyte membrane 48.

The opposite surfaces of the solid polymer electrolyte membrane 48 are coated with an anode catalyst layer 50a and a cathode catalyst layer 52a, respectively. The anode catalyst layer 50a is made of a Ru (ruthenium)-based catalyst, for example, and the cathode catalyst layer 52a of a platinum catalyst, for example.

Each of the anode current collector 50 and the cathode current collector 52 is made of a sintered spherical atomized titanium powder (porous electric conductor), and has a smooth surface area which is etched after it is cut to shape. Each of the anode current collector 50 and the cathode current collector 52 has a porosity in the range of 10% to 50%, or more preferably in the range from 20% to 40%. The unit cells 24 have water supply passages 56 defined in outer circumferential edges thereof for supplying water (pure water). The water supply passages 56 of the unit cells 24 are held in fluid communication with each other along the stacked direction of the stack assembly. The unit cells 24 also have discharge passages 58 defined in outer circumferential edges thereof for discharging oxygen generated by a reaction therein and unreacted water (mixed fluid). The discharge passages 58 of the unit cells 24 are held in fluid communication with each other along the stacked direction of the stack assembly. The unit cells 24 also have hydrogen passages 60 defined in outer circumferential edges thereof for discharging hydrogen generated by a reaction therein. The hydrogen passages 60 of the unit cells 24 are held in fluid communication with each other along the stacked direction of the stack assembly.

Each of the anode separators 44 has a first flow field 64 defined in a surface thereof which faces the membrane electrode assembly 42 and connected to the water supply passages 56. The first flow field 64 is disposed in a range corresponding to the surface area of the anode current collector 50. The first flow field 64 comprises a plurality of flow field grooves, a plurality of embossed ridges, or the like.

Each of the cathode separators 46 has a second flow field 68 defined in a surface thereof which faces the membrane electrode assembly 42 and connected to the hydrogen passages 60. The second flow field 68 is disposed in a range corresponding to the surface area of the cathode current collector 52. The second flow field 68 comprises a plurality of flow field grooves, a plurality of embossed ridges, or the like.

The water circulating apparatus 14 includes circulation pump 74, an ion exchanger 76, and a circulation pipe 72 extending through the circulation pump 74 and the ion exchanger 76. The circulation pipe 72 has an end connected to the water supply passages 56 of the water electrolysis apparatus 12 and an opposite end connected to the bottom of a tank 78 of the gas-liquid separating apparatus 16. The tank 78 has a top wall connected to an end of a return pipe 80 whose opposite end is connected to the discharge passages 58 of the water electrolysis apparatus 12.

The tank 78 is also connected to a pure water supply pipe 84 which is connected to the pure water producing apparatus 18 and an oxygen discharge pipe 86 for discharging oxygen separated from pure water in the tank 78.

The hydrogen passages 60 of the water electrolysis apparatus 12 are connected to an end of a high-pressure hydrogen pipe 88 whose opposite end is connected to a high-pressure hydrogen supply unit such as a fuel tank or the like, not shown.

As shown in FIG. 2, the water electrolysis system 10 also includes valve/fittings 90 such as various couplings, pipe valves, etc., electric components such as an ignition device, a high-current power relay 92, etc., and electric devices 94 excluding an ignition device.

The casing 22 has an accommodating chamber 96 defined therein which accommodates therein the water electrolysis apparatus 12, the gas-liquid separating apparatus 16, the pure water producing apparatus 18, the ion exchanger 76, the valve/fittings 90, and the electric devices 94.

The casing 22 also has a pair of first electric component compartments 100a (electric component compartment A), 100b (electric component compartment B) defined therein which are separated from the accommodating chamber 96 by a first housing 98. Two first fans 102 (see FIG. 3) for introducing external air into the first housing 98 are mounted on an end wall of the first housing 98. A discharge port 104 for discharging an internal air from the first housing 98 when the first fans 102 are actuated is mounted on an opposite end wall of the first housing 98.

The first electric component compartments 100a, 100b are connected to each other through an opening defined in a wall 106 that lies between the first electric component compartments 100a, 100b. The first electric component compartment 100a houses therein electric components which generate a relatively small amount of heat and which are susceptible to heat and noise, such as the controller 20 (first electric component), for example. The first electric component compartment 100b houses therein electric components which generate a relatively large amount of heat and a low level of noise, such as the electrolysis power supply 38 (first electric component), for example. The first fan 102 delivers air in a direction from the first electric component compartment 100a to the first electric component compartment 100b.

The casing 22 further has a second electric component compartment 110 (electric component compartment C) defined therein which is separated from the accommodating chamber 96 by a second housing 108. The second electric component compartment 110 houses therein electric components which generate a relatively small amount of heat and a large level of noise and which are resistant to heat, such as the high-current power relay 92 (second electric component), for example.

Figure 3:
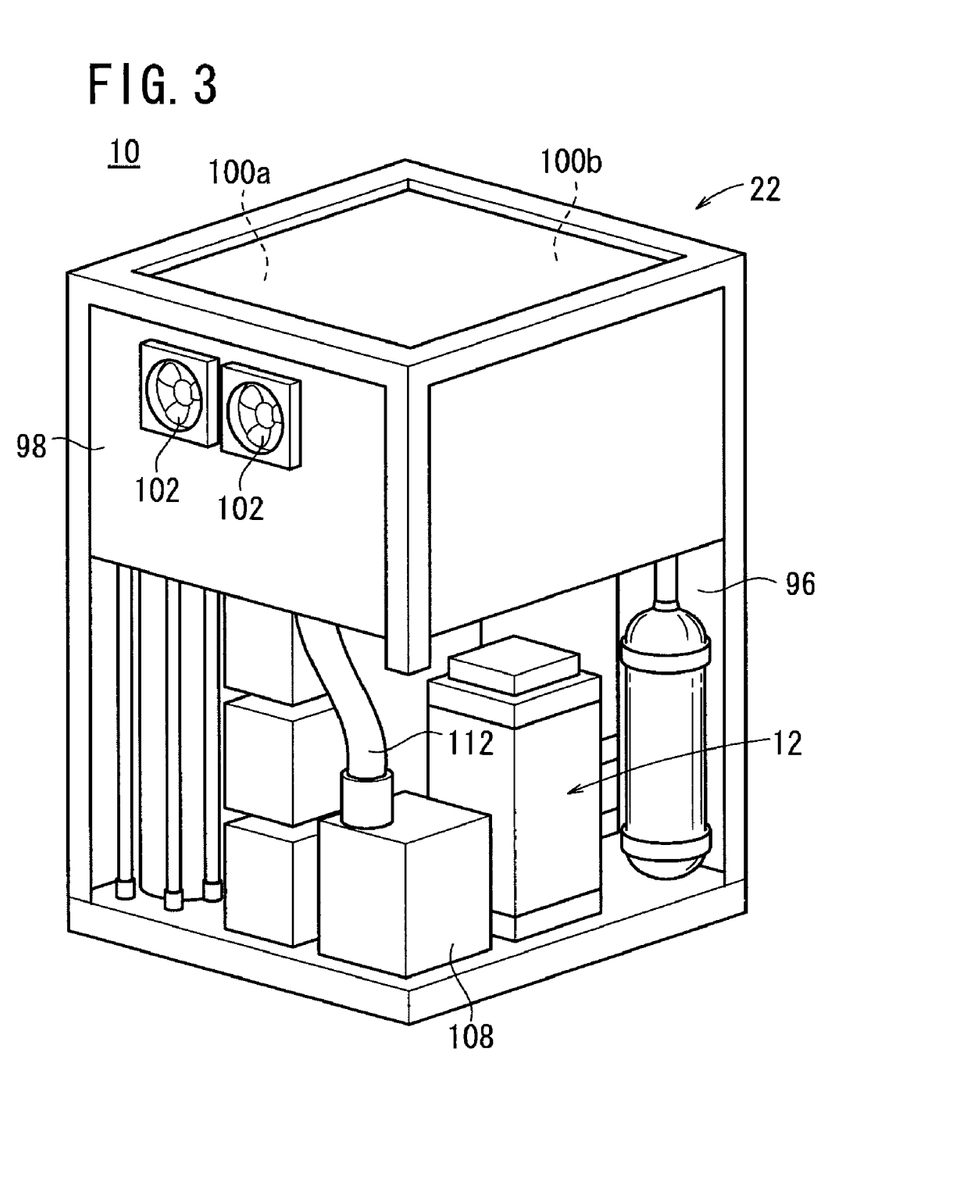
FIG. 3 is a perspective view, partly cut away, of the water electrolysis system according to the first embodiment.

The first housing 98 has a side region near the first fans 102 which is connected to an upper region of the second housing 108 by a pipe 112 (see FIGS. 2 and 3). The pipe 112 has a function as an air duct for supplying external air drawn in by the first fans 102 from the first electric component compartment 100a to the second electric component compartment 110, and also a function as a wiring duct through which electric wires connected to the high-current power relay 92 and other electric components in the second electric component compartment 110 are connected to the controller 20.

A second fan 114 for discharging internal air out of the accommodating chamber 96 is mounted on an end wall of the accommodating chamber 96, and an inlet port 116 for introducing external air into the accommodating chamber 96 when the second fan 114 is actuated is mounted on an opposite end wall of the accommodating chamber 96. The second fan 114 is positioned above the water electrolysis apparatus 12. A hydrogen sensor 118 is disposed in the accommodating chamber 96 above and near the second fan 114. The accommodating chamber 96 is kept under a negative pressure, whereas the first electric component compartments 100a, 100b and the second electric component compartment 110 are kept under a positive pressure.

Figure 4:
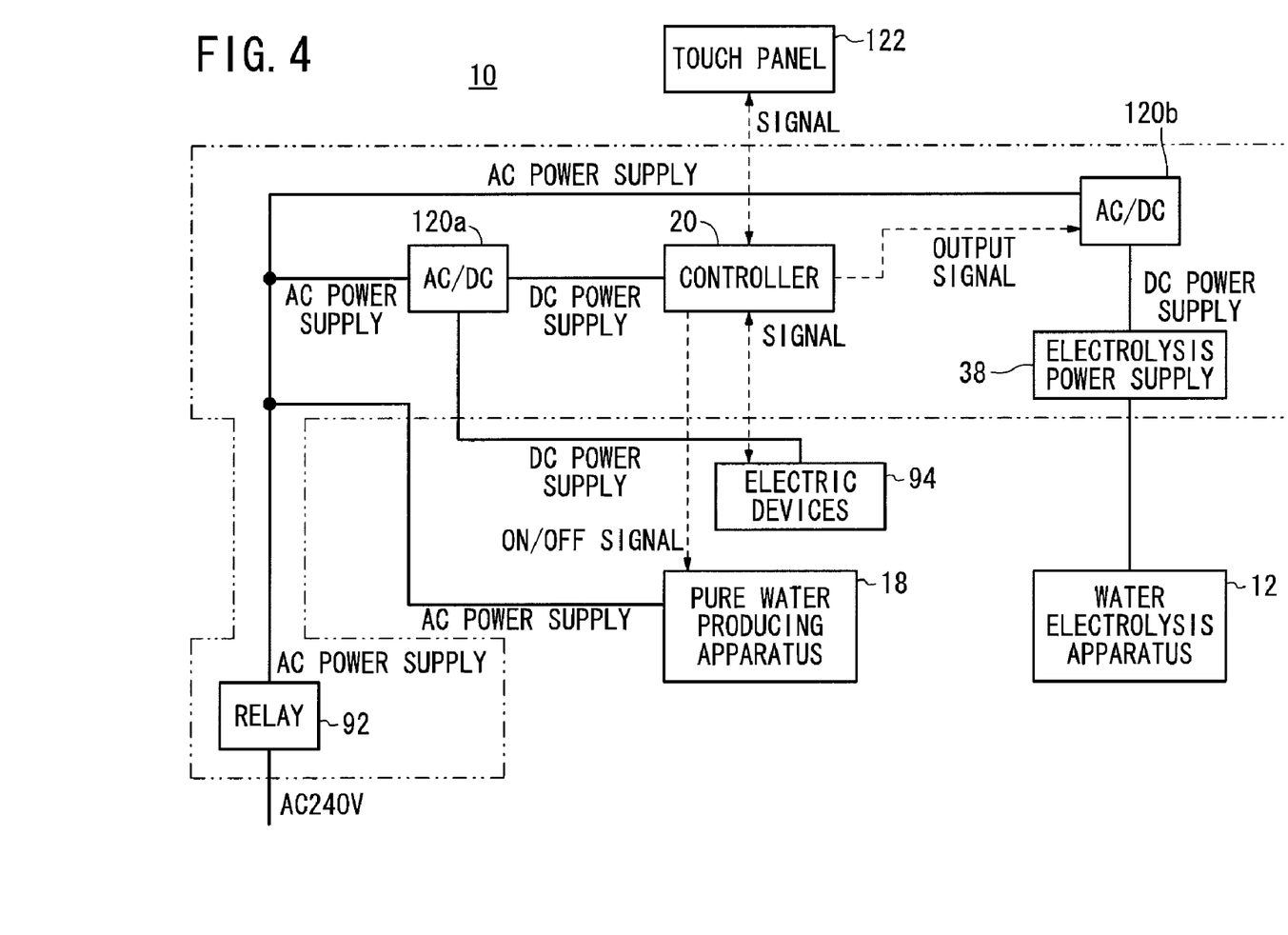
FIG. 4 is a block diagram of the water electrolysis system according to the first embodiment.

As shown in FIG. 4, the high-current power relay 92 is electrically connected to an external AC power supply of 240 V, for example, and supplies AC electric energy to AC/DC converters 120a, 120b.

The AC/DC converter 120a supplies DC electric energy to the controller 20 and the electric devices 94. The AC/DC converter 120b supplies DC electric energy to the electrolysis power supply 38. The high-current power relay 92 also supplies the AC electric energy to the pure water producing apparatus 18.

The controller 20 receives signals from and sends signals to a touch panel 122 as a user interface. The controller 20 sends a turn-on signal and a turn-off signal to the pure water producing apparatus 18, and also receives signals from and sends signals to the electric devices 94.

Figure 5:
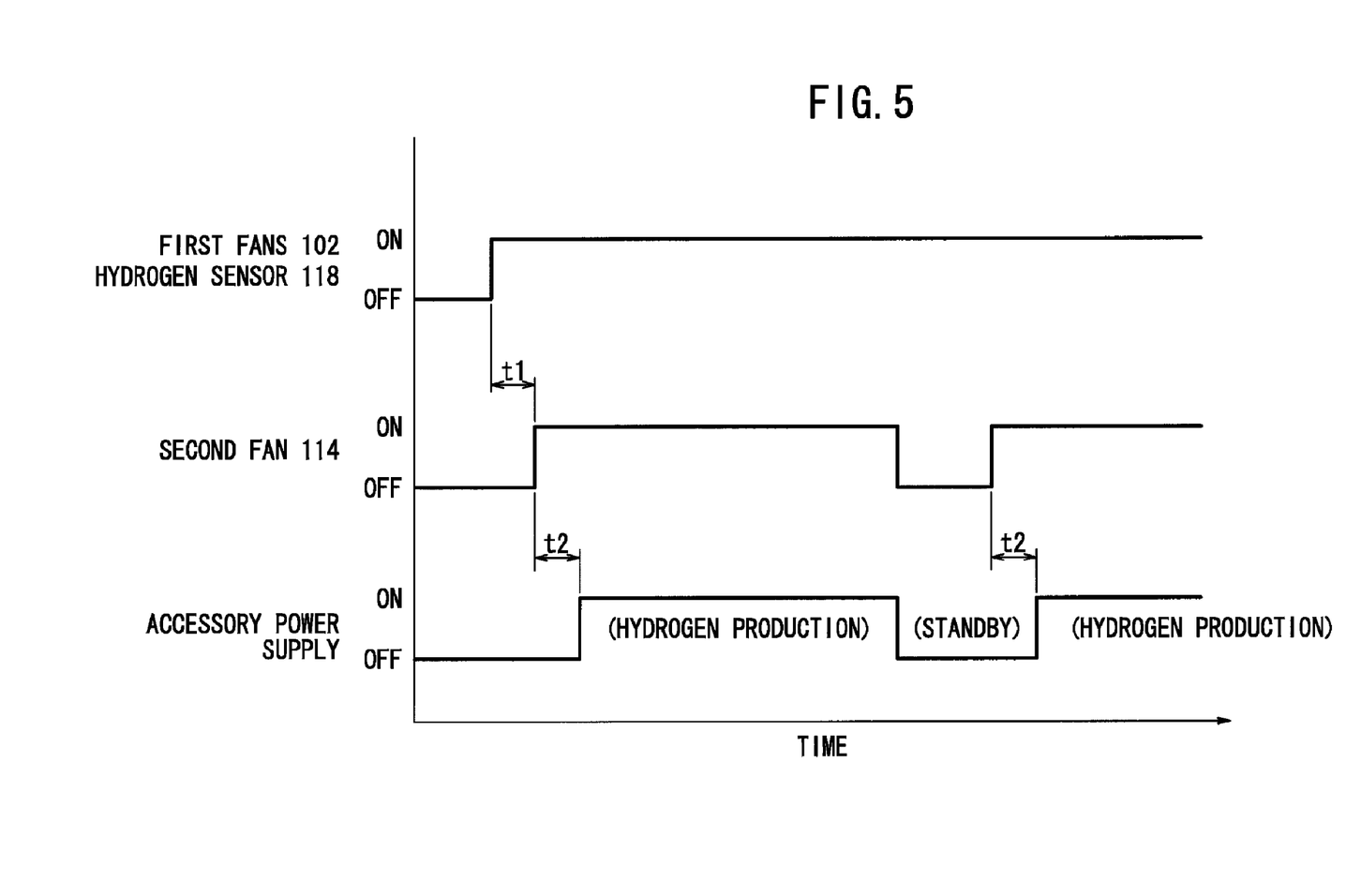
FIG. 5 is a timing chart illustrative of a method of operating the water electrolysis system according to the first embodiment.

Operation of the water electrolysis system 10 in relation to an operating method according to the present embodiment will be described below with reference to a timing chart shown in FIG. 5.

When the water electrolysis system 10 is activated, the first fans 102 and the hydrogen sensor 118 are turned on. External air is forcibly introduced into the first electric component compartments 100a, 100b by the first fans 102. The first electric component compartments 100a, 100b are now maintained under a positive pressure while being continuously ventilated (first step). Air is also introduced from the first electric component compartment 100a through the pipe 112 into the second electric component compartment 110. Therefore, the second electric component compartment 110 is also maintained under a positive pressure while being continuously ventilated (first step).

Upon elapse of time t1 after the first fans 102 are turned on, the second fan 114 is turned on. Since internal air is discharged from the accommodating chamber 96 by the second fan 114, the accommodating chamber 96 is maintained under a negative pressure while being continuously ventilated (second step).

Upon elapse of time t2 after the second fan 114 is turned on, various accessories including the electric devices 94, the circulation pump 74 of the water circulating apparatus 14, the pure water producing apparatus 18, the electrolysis power supply 38, etc. are turned on, enabling the water electrolysis apparatus 12 to start producing hydrogen (third step). Specifically, the pure water producing apparatus 18 produces pure water from tap water and supplies the produced pure water to the tank 78 of the gas-liquid separating apparatus 16.

When the circulation pump 74 is actuated, it supplies the water in the tank 78 through the circulation pipe 72 to the water supply passages 56 of the water electrolysis apparatus 12. The electrolysis power supply 38 applies a voltage between the terminals 34a, 34b of the terminal plates 26a, 26b.

In each of the unit cells 24, the water is supplied from the water supply passage 56 into the first flow field 64 of the anode separator 44 and moves in and along the anode current collector 50. The water is electrolyzed by the anode catalyst layer 50a, generating hydrogen ions, electrons, and oxygen. The hydrogen ions generated by the anodic reaction move through the solid polymer electrolyte membrane 48 to the cathode catalyst layer 52a where they combine with the electrons to produce hydrogen.

The produced hydrogen flows along the second flow field 68 that is defined between the cathode separator 46 and the cathode current collector 52. The hydrogen is kept under a pressure higher than the pressure in the water supply passage 56, and flows through the hydrogen passage 60 for removal from the water electrolysis apparatus 12 through the high-pressure hydrogen pipe 88.

The oxygen generated by the anodic reaction and the unreacted water flow in the first flow field 64, and the mixed fluid thereof then flows through the discharge passage 58 for being discharged into the return pipe 80 of the water circulating apparatus 14. The unreacted water and the oxygen are introduced into the tank 78 where they are separated from each other. The water is introduced from the circulation pipe 72 through the ion exchanger 76 into the water supply passages 56 by the circulation pump 74. The oxygen is discharged through the oxygen discharge pipe 86.

When the water electrolysis apparatus 12 ends its hydrogen producing process, the water electrolysis system 10 enters a standby mode. In the standby mode, the first fans 102 continue to keep the first electric component compartments 100a, 100b under a positive pressure while continuously ventilating the first electric component compartments 100a, 100b, and the second fan 114 is turned off (see FIG. 5). For starting to produce hydrogen again, the second fan 114 is turned on, and after elapse of time t2, the water electrolysis apparatus 12 resumes its hydrogen producing process.

According to the first embodiment, as shown in FIG. 2, the first fans 102 introduce external air from outside of the casing 22 into the first electric component compartments 100a, 100b to cool the controller 20 and the electrolysis power supply 38 in the first electric component compartments 100a, 100b. Specifically, the introduced external air is applied to the controller 20 which generates a relatively small amount of heat and which is susceptible to heat, then cools the electrolysis power supply 38 which generates a relatively large amount of heat, and thereafter is discharged from the first electric component compartment 100b through the discharge port 104. Therefore, the controller 20 is not exposed to the heat generated by the electrolysis power supply 38.

Since external air is forcibly introduced into the first electric component compartments 100a, 100b, they are kept under a positive pressure. Accordingly, the first electric component compartments 100a, 100b can effectively prevent a hydrogen gas from entering therein from the accommodating chamber 96.

The second electric component compartment 110 is supplied with air from the first electric component compartment 100a through the pipe 112. Therefore, the second electric component compartment 110 which houses the high-current power relay 92, etc. is kept under a positive pressure. As a result, the second electric component compartment 110 can also effectively prevent a hydrogen gas from entering therein from the accommodating chamber 96.

The first electric component and the second electric component which have different characteristics, e.g., the controller 20 which is susceptible to noise and the high-current power relay 92 which generates a high level of noise, are not placed in one compartment, but housed in different compartments. Therefore, the controller 20 and the high-current power relay 92 do not adversely affect each other, allowing the water electrolysis system 10 to operate well.

The second electric component compartment 110 is free of any air blowers such as a fan. The number of fans that are required to maintain a positive pressure in the water electrolysis system 10 is thus effectively reduced, making the water electrolysis system 10 simple and economical and making it possible to accommodate various electronic components in an appropriate environment.

As described above, the pipe 112 has a function as an air duct for supplying external air drawn in by the first fans 102 from the first electric component compartment 100a to the second electric component compartment 110, and also a function as a wiring duct through which electric wires connected to the high-current power relay 92 and other electric components in the second electric component compartment 110 are connected to the controller 20. The pipe 112 which is multifunctional as an air duct and a wiring duct is highly simple and economical.

According to the first embodiment, the first electric component compartments 100a, 100b and the second electric component compartment 110 are initially kept under a positive pressure, and then the accommodating chamber 96 is kept under a negative pressure while being ventilated, after which the water electrolysis apparatus 12 is operated.

Even if hydrogen leaks from the water electrolysis apparatus 12 into the accommodating chamber 96, it is reliably prevented from entering into the first electric component compartments 100a, 100b and the second electric component compartment 110. Therefore, the first electric component compartments 100a, 100b and the second electric component compartment 110 are not required to be highly hermetically sealed with respect to the accommodating chamber 96. The water electrolysis system 10 is thus simple in structure and economical to produce.

When the water electrolysis apparatus 12 is shut down and the water electrolysis system 10 enters a standby mode, the first electric component compartments 100a, 100b and the second electric component compartment 110 are continuously ventilated, and the accommodating chamber 96 stops being ventilated. This is because the first electric component compartments 100a, 100b and the second electric component compartment 110 are kept under a positive pressure, preventing hydrogen from being introduced into the first electric component compartments 100a, 100b and the second electric component compartment 110 from the accommodating chamber 96.

While the water electrolysis system 10 is in the standby mode, the second fan 114 is de-energized and hence does not consume electric power and produce noise.

Figure 6:
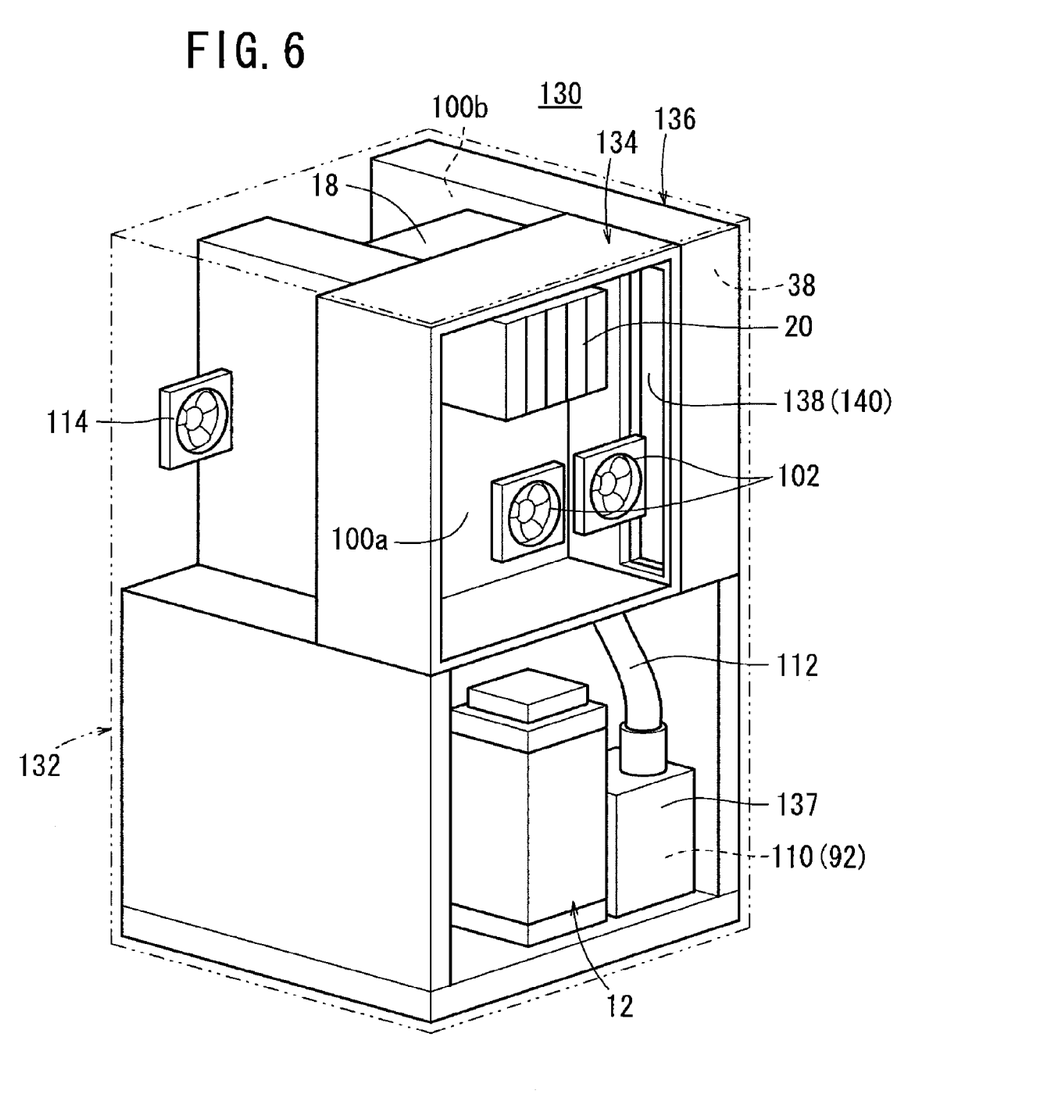
FIG. 6 is a perspective view, partly cut away, of a water electrolysis system according to a second embodiment of the present invention.
Figure 7:
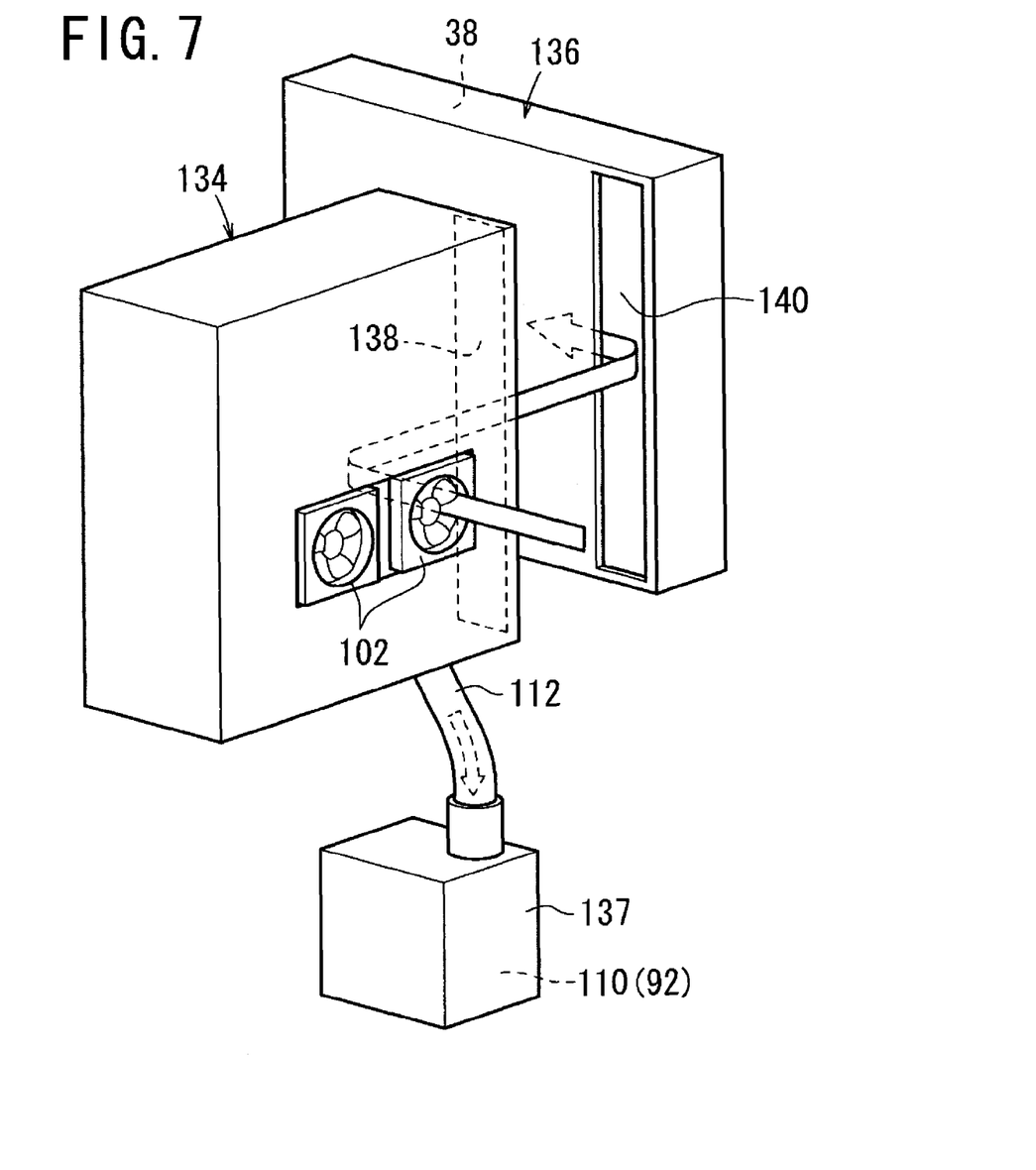
FIG. 7 is an exploded perspective view of a casing of the water electrolysis system according to the second embodiment.

FIGS. 6 and 7 show a water electrolysis system 130 according to a second embodiment of the present invention. Those parts of the water electrolysis system 130 which are identical to those of the water electrolysis system 10 according to the first embodiment are denoted by identical reference characters, and will not be described below.

As shown in FIGS. 6 and 7, the water electrolysis system 130 has its components disposed in a casing 132 which corresponds to the casing 22 of the water electrolysis system 10. Specifically, the casing 132, which is indicated by the two-dot-and-dash lines in FIG. 6, includes a first housing 134, a second housing 136, and a pure water producing apparatus 18 which are disposed in an upper region of the casing 132. The first housing 134 and the second housing 136 have a box shape whose vertical and horizontal dimensions are greater than a thicknesswise dimension (depth) thereof, and are coupled to each other in an L shape as viewed in plan. The water electrolysis system 130 also includes a third housing 137 disposed in a lower region of the casing 132 and connected to the first housing 134 by a pipe 112. The third housing 137 accommodates a power relay 92, etc. in a second electric component compartment 110 defined therein.

The first housing 134 has a first electric component compartment 100a defined therein which accommodates therein a controller 20, a sensor amplifier, etc. that are disposed along an inner wall surface thereof. Two (a pair of) first fans 102 are mounted on a wider wall of the first housing 134, and a vertically elongate opening 138 is defined in a narrower wall of the first housing 134 which faces the second housing 136.

The second housing 136 has a first electric component compartment 100b defined therein which accommodates an electrolysis power supply 38. A vertically elongate opening 140 is defined in a wider wall of the second housing 136 which faces the narrower wall of the first housing 134. The vertically elongate opening 140 is aligned with and connected to the vertically elongate opening 138. When the first fans 102 are actuated, air is introduced into the first housing 134, cooling and pressurizing the first housing 134, and then introduced through the vertically elongate openings 138, 140 into the second housing 136, cooling and pressurizing the second housing 136. Thereafter, the air is discharged out of the second housing 136.

According to the second embodiment, the water electrolysis system 130 is simple and economical and capable of accommodating various electronic components in an appropriate environment. As the first electric component compartments 100a, 100b and the second electric component compartment 110 are not required to be highly hermetically sealed, the water electrolysis system 130 is simple in structure and economical to manufacture.

Although certain preferred embodiments of the present invention have been shown and described in detail, it should be understood that various changes and modifications may be made therein without departing from the scope of the appended claims.

What is claimed is:

1. A water electrolysis system comprising:
   a water electrolysis apparatus including an electrolyte membrane and current collectors disposed on respective opposite anode and cathode sides of the electrolyte membrane, wherein the water electrolysis apparatus electrolyzes water to generate oxygen on the anode side and hydrogen on the cathode side; and
   a casing having an accommodating chamber accommodating the water electrolysis apparatus therein;
   wherein the casing defines therein:
   a first electric component compartment separate from the accommodating chamber and housing a first electric component therein, the first electric component compartment having a first fan for introducing external air; and
   a second electric component compartment separate from the accommodating chamber and housing a second electric component therein, the second electric component compartment being connected to the first electric component compartment by a pipe.

2. The water electrolysis system according to claim 1, wherein the pipe doubles as an air duct and a wiring duct.

3. The water electrolysis system according to claim 1, wherein the accommodating chamber is kept under a negative pressure; and
   the first electric component compartment and the second electric component compartment are kept under a positive pressure.

4. A method of operating a water electrolysis system having a water electrolysis apparatus which includes an electrolyte membrane and current collectors disposed on respective opposite anode and cathode sides of the electrolyte membrane, wherein the water electrolysis apparatus electrolyzes water to generate oxygen on the anode side and hydrogen on the cathode side, and a casing having an accommodating chamber accommodating the water electrolysis apparatus therein and an electric component compartment separate from the accommodating chamber and housing an electric component therein, the method comprising:

a first step of keeping the electric component compartment under a positive pressure while ventilating the electric component compartment;

a second step of keeping the accommodating chamber under a negative pressure while ventilating the accommodating chamber after the first step is started; and a third step of starting to operate the water electrolysis apparatus after the second step is started.

5. The method according to claim 4, wherein when the water electrolysis apparatus is shut down and the water electrolysis system enters a standby mode, the electric component compartment is continuously ventilated and the accommodating chamber stops being ventilated.

* * * * *